US012136509B2

(12) United States Patent
Xu et al.

(10) Patent No.: US 12,136,509 B2
(45) Date of Patent: Nov. 5, 2024

(54) MEMS SOLENOID INDUCTOR AND MANUFACTURING METHOD THEREOF

(71) Applicant: BEIHANG UNIVERSITY, Haidian District (CN)

(72) Inventors: Tiantong Xu, Haidian District (CN); Zhi Tao, Haidian District Beijing (CN); Haiwang Li, Haidian District (CN); Jiamian Sun, Haidian District (CN); Hanxiao Wu, Haidian District (CN); Kaiyun Zhu, Haidian District (CN); Yanxin Zhai, Haidian District (CN); Xiaoda Cao, Haidian District (CN); Wenbin Wang, Haidian District (CN); Weidong Fang, Haidian District (CN)

(73) Assignee: BEIHANG UNIVERSITY, Beijing (CN)

( * ) Notice: Subject to any disclaimer, the term of this patent is extended or adjusted under 35 U.S.C. 154(b) by 649 days.

(21) Appl. No.: 17/290,553

(22) PCT Filed: Jul. 8, 2019

(86) PCT No.: PCT/CN2019/095062
§ 371 (c)(1),
(2) Date: Apr. 30, 2021

(87) PCT Pub. No.: WO2020/087972
PCT Pub. Date: May 7, 2020

(65) Prior Publication Data

US 2022/0013275 A1 Jan. 13, 2022

(30) Foreign Application Priority Data

Oct. 30, 2018 (CN) ........................ 201811277260.8
Dec. 11, 2018 (CN) ........................ 201811509400.X

(51) Int. Cl.
*H01F 27/245* (2006.01)
*H01F 27/28* (2006.01)

(52) U.S. Cl.
CPC ....... *H01F 27/245* (2013.01); *H01F 27/2895* (2013.01)

(58) Field of Classification Search
CPC ............... H01F 27/245; H01F 27/2895; H01F 17/0013; H01F 17/062; H01F 41/046; H01F 17/0033
See application file for complete search history.

(56) References Cited

U.S. PATENT DOCUMENTS

2003/0011458 A1 1/2003 Nuytkens et al.
2008/0186124 A1 8/2008 Schaffer et al.
(Continued)

FOREIGN PATENT DOCUMENTS

CN 101553890 A 10/2009
CN 101593605 A 12/2009
(Continued)

OTHER PUBLICATIONS

Machine Translation for Document WO2008133018A1.*
(Continued)

*Primary Examiner* — Mohamad A Musleh
(74) *Attorney, Agent, or Firm* — Dickinson Wright PLLC

(57) ABSTRACT

Embodiments of the present application provides a MEMS solenoid inductor, including: a silicon substrate, a soft magnetic core, and a solenoid; wherein the soft magnetic core is wrapped inside the silicon substrate, the silicon substrate is provided with a spiral channel, the soft magnetic core passes through a center of the spiral channel, and the solenoid is disposed in the spiral channel. By disposing the soft magnetic core and the solenoid of the inductor inside the silicon substrate completely, the thickness of the silicon (Continued)

substrate is fully utilized, and the obtained inductor has a larger winding cross-sectional area and improved magnetic flux, which increases the inductance value of the inductor; at the same time, the silicon substrate plays a protective role on the soft magnetic core and the solenoid, the strength of the inductor is improved, and the good impact resistance is provided.

9 Claims, 8 Drawing Sheets

(56) References Cited

U.S. PATENT DOCUMENTS

| | | | | |
|---|---|---|---|---|
| 2008/0231402 | A1 * | 9/2008 | Jow | H01F 17/0013 336/200 |
| 2009/0322461 | A1 * | 12/2009 | Hebert | H01F 41/046 336/83 |
| 2014/0061854 | A1 | 3/2014 | Chen | |
| 2015/0340338 | A1 * | 11/2015 | Lee | H01F 17/0013 438/3 |

FOREIGN PATENT DOCUMENTS

| | | | | | |
|---|---|---|---|---|---|
| CN | 102682951 | A | | 9/2012 | |
| CN | 103219139 | A | | 7/2013 | |
| CN | 104272406 | A | | 1/2015 | |
| CN | 109326421 | A | | 2/2019 | |
| CN | 109741903 | A | | 5/2019 | |
| JP | 2002525846 | A | | 8/2002 | |
| JP | 2004006458 | A | | 1/2004 | |
| JP | 2007214348 | A | | 8/2007 | |
| JP | 2008066592 | A | | 3/2008 | |
| JP | 2009135325 | A | | 6/2009 | |
| JP | 2011114033 | A | | 6/2011 | |
| JP | 2013078144 | A | | 4/2013 | |
| JP | 2013527620 | A | | 6/2013 | |
| JP | 2016051765 | A | | 4/2016 | |
| JP | 2018046181 | A | | 3/2018 | |
| KR | 20020068769 | A | * | 8/2002 | |
| WO | WO-2008133018 | A1 | * | 11/2008 | H01Q 1/2225 |
| WO | WO-2011103259 | A2 | * | 8/2011 | H01F 17/043 |

OTHER PUBLICATIONS

Tiantong Xu, et al.; "3D MEMS In-Chip Solenoid Inductor With High Inductance Density for Power MEMS Device"; IEEE Electron Device Letters, vol. 40, No. 11, Nov. 2019.
Tiantong Xu, et al.; "A 3D MEMS In-Chip Solenoid Inductor of High Inductance Density for Future Power-Mems Device"; 1Beihang University, Beijing, China and 2Massachusetts Institute of Technology, Boston, USA.
Jeong-Il Kim et al.; "Design of Toroidal Inductors Using Stressed Metal Technology"; School of Electrical and Computer Engineering, Purdue University, West Lafayette, IN 47907-2035.
Jun-Bo Yoon, et al.; "Surface Micromachined Solenoid On-Si and On-Glass Inductors for RF Applications"; IEEE Electron Device Letters, vol. 20, No. 9, Sep. 1999.
FSR of Priority Application No. CN201811509400X; Dec. 11, 2018.
FSR of Priority Application No. CN201811272608; Oct. 30, 2018.
Higher Mechanical Design Theory (relevant section) pp. 287-295.
ISR PCT/CN2019/095062, Jul. 8, 2019.
Written Opinion of the International Searching Authority; PCT/CN2019/095062.

* cited by examiner

MEMS SOLENOID INDUCTOR AND MANUFACTURING METHOD THEREOF

CROSS-REFERENCE TO RELATED APPLICATION

The present application is a 371 United States National Stage Application, which claims the benefit of PCT International Patent Application No. PCT/CN2019/095062, filed Jul. 8, 2019, which claims priority to Chinese Application No. 201811277260.8 filed on Oct. 30, 2018, entitled "MEMS Toroidal Solenoid Inductor and Manufacturing Method Thereof" and Chinese Application No. 201811509400.X filed on Dec. 11, 2018, entitled "MEMS Linear Solenoid Inductor and Manufacturing Method Thereof", all of which are hereby incorporated by reference in their entirety.

FIELD OF TECHNOLOGY

Embodiments of the present application relate to the technical field of micro-electro-mechanical system (MEMS), and in particular, to a MEMS solenoid inductor and a manufacturing method thereof.

BACKGROUND

A micro-inductor in a micro-electro-mechanical system (MEMS) consists of a magnetic core and windings. Compared with conventional inductors, the size of the magnetic core is dramatically decreased and the winding form has also changed. Micro-inductors are widely used in micro-electronic equipment and information equipment, and may play a role in voltage conversion, current conversion, impedance conversion, isolation, voltage stabilization and so on.

At present, micro-inductors based on MEMS technology are mainly divided into two types, i.e., planar spiral type and solenoid type. For the structure of the planar spiral micro-inductor, as the number of turns of winding increases, the diameter of coils becomes larger and the total magnetic flux along a core cannot increase linearly but the increment of the total magnetic flux gradually decreases. Therefore, the number of turns of this structure is generally limited, resulting in a bottleneck in the increase of the total power of this inductor. While the solenoid inductor overcomes the limitation of the number of turns of winding, and the solenoid winding makes full use of the vertical space inside a substrate. While the same inductive performance is obtained when the inductor is integrated in a circuit, the occupied chip surface space is smaller, which is conducive to the further development of chip miniaturization.

However, most of the current micro-inductors based on MEMS technology use thin-film manufacturing processes which belongs to an additive manufacturing method. Therefore, the majority of the structure of the obtained micro-inductor is located above the surface of the substrate, which makes it difficult to ensure the strength of the inductor. The inductor manufactured by the thin-film process has a small wire area through which large current cannot flow, which limits not only the current flow capacity, but also the application of the inductors in high current and power devices. In addition, the inductor obtained by the thin-film manufacturing process has a limited vertical height such that windings of the inductor have small cross-sectional area, resulting in low magnetic flux and small inductance of the inductor.

SUMMARY

Embodiments of the present application provide a MEMS solenoid inductor and a manufacturing method thereof that solve the above-mentioned problems or at least partially solve the above-mentioned problems.

In a first aspect, an embodiment of the present application provides a MEMS solenoid inductor, including: a silicon substrate, a soft magnetic core, and a solenoid; wherein, the soft magnetic core is wrapped inside the silicon substrate, the silicon substrate is provided with a spiral channel, the soft magnetic core passes through a center of the spiral channel, and the solenoid is disposed in the spiral channel; wherein, the soft magnetic core is a toroidal soft magnetic core or a linear soft magnetic core.

Further, the silicon substrate includes an upper silicon substrate and a lower silicon substrate, the soft magnetic core includes an upper core and a lower core, and the upper core has the same shape as the lower core; and the upper silicon substrate is provided with a core slot on a lower surface thereof corresponding to the shape of the upper core, and the lower silicon substrate is provided with a core slot on an upper surface thereof corresponding to the shape of the lower core; the upper core and the lower core are disposed in the corresponding core slots, respectively, and the lower surface of the upper silicon substrate and the upper surface of the lower silicon substrate are bonded to each other, so that a lower surface of the upper core and an upper surface of the lower core are aligned with each other.

Further, the spiral channel includes a plurality of first horizontal trenches, a plurality of second horizontal trenches, and a plurality of vertical through holes; the first horizontal trenches are disposed on an upper surface of the silicon substrate, the second horizontal trenches are disposed on a lower surface of the silicon substrate, and the vertical through holes penetrate the upper and lower surfaces of the silicon substrate; and a head and a tail of any one of the first horizontal trenches of the spiral channel communicate with two vertical through holes respectively, and the two vertical through holes communicate with two adjacent second horizontal trenches, respectively.

Further, the MEMS solenoid inductor also includes two pins and two pin slots; and the two pin slots are disposed on the upper surface of the silicon substrate, and the two pin slots communicate with the head and the tail of the spiral channel, respectively, and the two pins are disposed in the two pin slots, respectively.

Further, the soft magnetic core is made of iron-nickel alloy material or iron-cobalt alloy material.

Further, the solenoid is made of metallic copper.

In a second aspect, an embodiment of the present application provides a method for manufacturing a MEMS solenoid inductor, including:

- step 1, fabricating an upper silicon substrate and a lower silicon substrate, respectively;
- wherein, if the soft magnetic core is the toroidal soft magnetic core, the fabricating an upper silicon substrate includes:
  - performing a first thermal oxidation on a first silicon wafer with a first preset thickness;
  - according to the structure of the spiral channel, performing deep silicon etching on an upper surface, inside and a lower surface of the first silicon wafer subjected to the first thermal oxidation respectively to obtain a plurality of first horizontal trenches, upper halves of a plurality of vertical through holes, and a core slot;

performing a second thermal oxidation on the first silicon wafer subjected to the deep silicon etching to obtain the upper silicon substrate;

wherein the fabricating a lower silicon substrate includes:

performing a first thermal oxidation on a second silicon wafer with the first preset thickness;

according to the structure of the spiral channel, performing deep silicon etching on an upper surface, inside and a lower surface of the second silicon wafer subjected to the first thermal oxidation respectively to obtain a core slot, lower halves of the plurality of vertical through holes and a plurality of second horizontal trenches;

performing a second thermal oxidation on the second silicon wafer subjected to the deep silicon etching to obtain the lower silicon substrate;

wherein, if the soft magnetic core is the linear soft magnetic core, the fabricating an upper silicon substrate includes:

performing a first thermal oxidation on a first silicon wafer with a first preset thickness;

according to the structure of the spiral channel, performing deep silicon etching on an upper surface, inside and a lower surface of the first silicon wafer subjected to the first thermal oxidation respectively to obtain a plurality of parallel first horizontal trenches, upper halves of a plurality of vertical through holes, and a core slot;

performing a second thermal oxidation on the first silicon wafer subjected to the deep silicon etching to obtain the upper silicon substrate;

wherein the fabricating a lower silicon substrate includes:

performing a first thermal oxidation on a second silicon wafer with the first preset thickness;

according to the structure of the spiral channel, performing deep silicon etching on an upper surface, inside and a lower surface of the second silicon wafer subjected to the first thermal oxidation respectively to obtain a core slot, lower halves of the plurality of vertical through holes and a plurality of parallel second horizontal trenches;

performing a second thermal oxidation on the second silicon wafer subjected to the deep silicon etching to obtain the lower silicon substrate;

step 2, electroplating inside the core slots of the upper silicon substrate and the lower silicon substrate to form an upper core and a lower core, respectively;

step 3, after aligning an upper surface of the upper silicon substrate and a lower surface of the lower silicon substrate with each other and aligning a lower surface of the upper core and an upper surface of the lower core with each other, bonding the upper silicon substrate and the lower silicon substrate at low temperature to form the spiral channel in the upper silicon substrate and the lower silicon substrate which are bonded; and step 4, electroplating in the spiral channel to form a solenoid, thereby obtaining the MEMS solenoid inductor.

Further, in one aspect, the electroplating inside the core slot of the upper silicon substrate to form an upper core includes:

after registering a metal mask with a core slot pattern with the core slot on a lower surface of the upper silicon substrate, tightly attaching the metal mask to the lower surface of the upper silicon substrate; and after magnetron sputtering metallic nickel or metallic cobalt with a second preset thickness as a seed layer on the lower surface of the upper silicon substrate, electroplating iron-nickel alloy or iron-cobalt alloy with a third preset thickness inside the core slot of the upper silicon substrate to obtain the upper core; correspondingly, the electroplating inside the core slot of the lower silicon substrate to form a lower core specifically includes:

after registering a metal mask with a core slot pattern with the core slot on an upper surface of the lower silicon substrate, tightly attaching the metal mask to the upper surface of the lower silicon substrate; and after magnetron sputtering metallic nickel or metallic cobalt with the second preset thickness as a seed layer on the upper surface of the lower silicon substrate, electroplating iron-nickel alloy or iron-cobalt alloy with the third preset thickness inside the core slot of the lower silicon substrate to obtain the lower core.

Further, in one aspect, the electroplating in the spiral channel to form a solenoid includes:

magnetron sputtering metallic titanium with a fourth preset thickness as an intermediate layer on a lower surface of the lower silicon substrate, magnetron sputtering metallic copper with a fifth preset thickness as a seed layer on the intermediate layer, and then electroplating metallic copper in the second horizontal trenches and the vertical through holes of the spiral channel until the metallic copper is filled to the position of a lower plane of the first horizontal trenches; and after magnetron sputtering metallic copper as a seed layer on an upper surface of the upper silicon substrate, electroplating metallic copper until the spiral channel is completely filled with metallic copper to obtain the solenoid.

Further, in one aspect, the fabricating an upper silicon substrate further includes:

according to the structure and position of two pins, performing deep silicon etching on the upper surface of the first silicon wafer subjected to the first oxidation to obtain two pin slots; correspondingly, In one aspect, step 4 further includes electroplating in the two pin slots to form the two pins.

For the MEMS solenoid inductor and the manufacturing method thereof according to the embodiments of the present application, by disposing the soft magnetic core and the solenoid of the inductor inside the silicon substrate completely, the thickness of the silicon substrate is fully utilized, the inductor obtained has a larger winding cross-sectional area and improved magnetic flux, which increase the inductance value of the inductor; at the same time, the silicon substrate plays a protective role on the soft magnetic core and the solenoid, the strength of the inductor is improved, and the good impact resistance is provided.

BRIEF DESCRIPTION OF THE DRAWINGS

In order to more clearly illustrate technical solutions disclosed in the embodiments of the present application or the prior art, the drawings needed to be used in the descriptions of the embodiments or the prior art will be briefly explained below. Obviously, the drawings in the following description are only certain embodiments of the present application, and other drawings can be obtained according to the drawings without any creative work for those skilled in the art.

REFERENCE NUMERALS

| | |
|---|---|
| 1-silicon substrate; | 2-toroidal soft magnetic core; |
| 2'-linear soft magnetic core; | 3-solenoid; |
| 4-pin; | 4'-pin slot; |
| 11-upper silicon substrate; | 12-lower silicon substrate; |
| 21-upper core; | 22-lower core; |
| 31'-first horizontal trench; | 32'-second horizontal trench; |
| 33'-vertical through hole | |

DETAILED DESCRIPTION

In order to make the objects, technical solutions and advantages of the embodiments of the present application more clear, the technical solutions in the embodiments of the present application are clearly described in the following in conjunction with the accompanying drawings in the embodiments of the present application. Obviously, the described embodiments are a part of the embodiments of the present application, and not all of the embodiments. All other embodiments obtained by a person of ordinary skill in the art based on the embodiments of the present application without any creative work belong to the protection scope of the present application.

In the MEMS solenoid inductor according to the present application, the soft magnetic core has a shape of a toroidal magnetic core or a linear soft magnetic core. The following describes the case where the soft magnetic core is the toroidal soft magnetic core and the linear soft magnetic core respectively.

Figure 1:
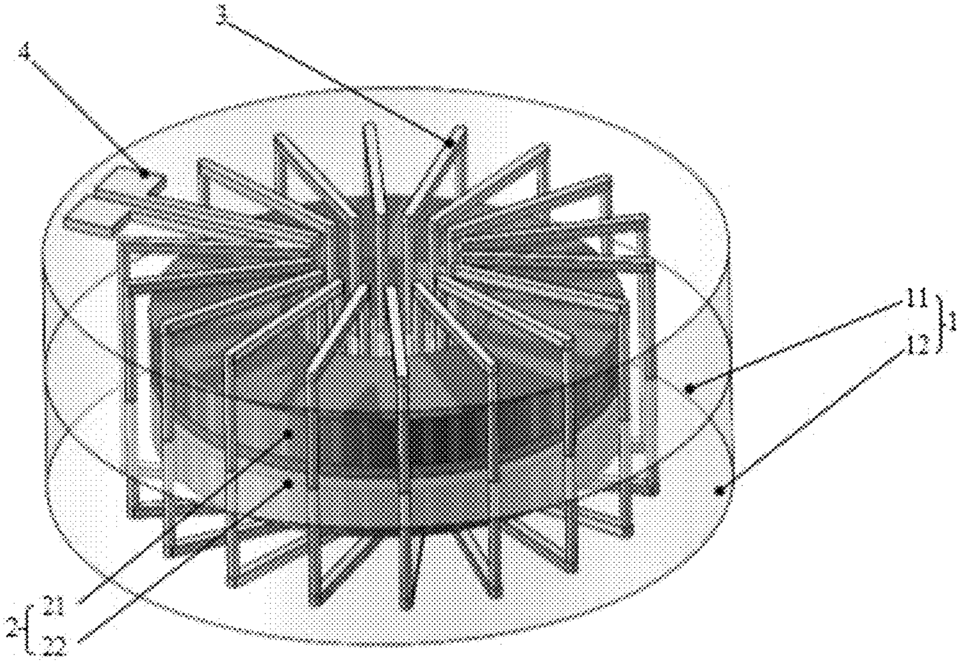
FIG. 1 is a schematic diagram showing a three-dimensional structure of a MEMS toroidal solenoid inductor according to an embodiment of the present application.
Figure 2:
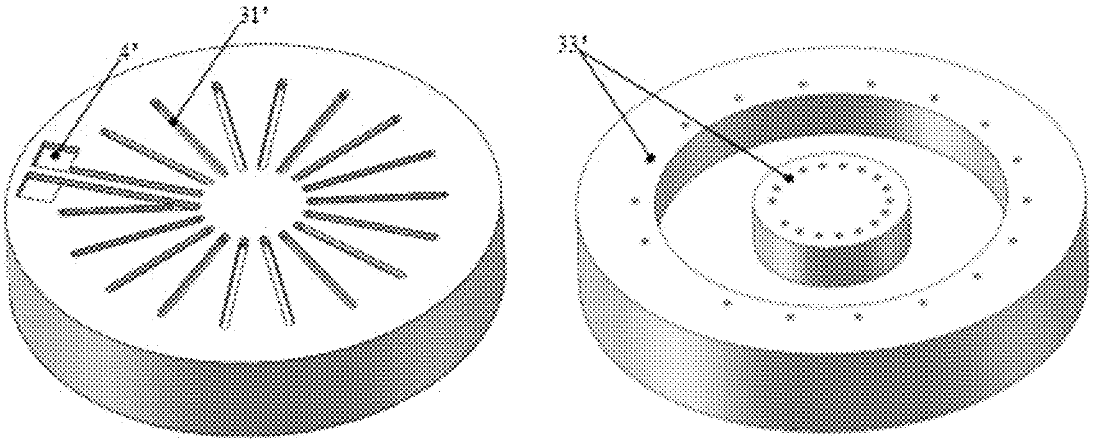
FIG. 2 is a first schematic diagram showing a three-dimensional structure of an upper silicon substrate according to an embodiment of the present application.
Figure 3:
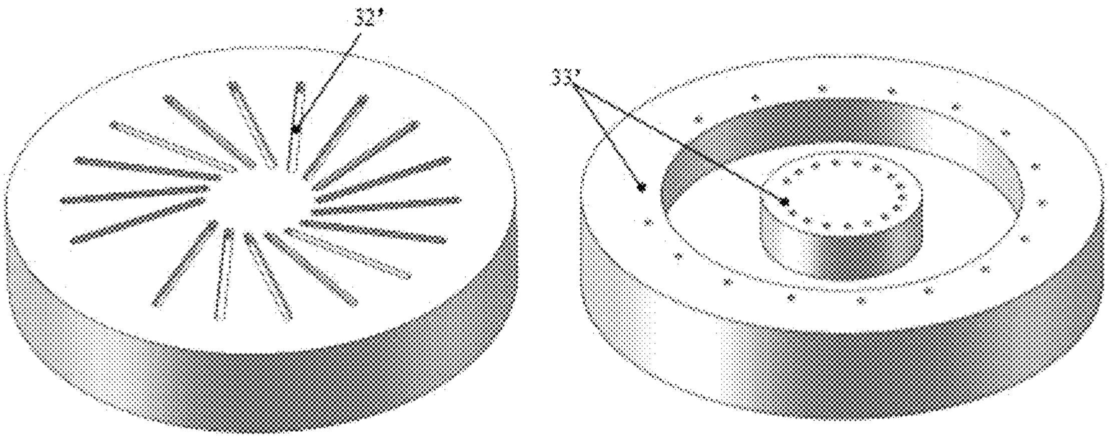
FIG. 3 is a first schematic diagram showing a three-dimensional structure of a lower silicon substrate according to an embodiment of the present application.

FIG. 1 is a schematic diagram showing a three-dimensional structure of a MEMS toroidal solenoid inductor according to an embodiment of the present application. As shown in FIG. 1, the MEMS toroidal solenoid inductor includes a silicon substrate 1, a toroidal soft magnetic core 2, and a solenoid 3; wherein, the toroidal soft magnetic core 2 is wrapped inside the silicon substrate 1, as shown in FIGS. 2 and 3, the silicon substrate 1 is provided with a spiral channel, two opposite sides of the toroidal soft magnetic core 2 pass through a center of the spiral channel, and the solenoid 3 is disposed in the spiral channel.

In an embodiment, since the spiral channel is disposed on the silicon substrate 1, the solenoid 3 disposed in the spiral channel is also disposed inside the silicon substrate 1, that is, the toroidal soft magnetic core 2 and the solenoid 3 of the inductor are both disposed inside the silicon substrate 1.

Specifically, the solenoid 3 has the same shape as the spiral channel, and the solenoid 3 is disposed in the spiral channel. Since the toroidal soft magnetic core 2 passes through the center of the spiral channel, the toroidal soft magnetic core 2 also passes through the center of the solenoid 3. When the inductor is working, the solenoid 3 is used as a winding of the inductor, head and tail ends of the solenoid 3 constitute an input end and an output end of the inductor, respectively. It may be understood that the inductance value of the inductor is determined by the number of turns of the solenoid 3.

For the MEMS toroidal solenoid inductor according to the embodiments of the present application, by disposing the toroidal soft magnetic core and the solenoid of the inductor inside the silicon substrate completely, the thickness of the silicon substrate is fully utilized, the inductor obtained has a larger winding cross-sectional area and improved magnetic flux, which increases the inductance value of the inductor; at the same time, the silicon substrate plays a protective role on the toroidal soft magnetic core and the solenoid, the strength of the inductor is improved, and the good impact resistance is provided.

In the foregoing embodiments, as shown in FIGS. 1-3, the silicon substrate 1 is divided into an upper silicon substrate 11 and a lower silicon substrate 12, the toroidal soft magnetic core 2 is divided into an upper core 21 and a lower core 22, and the upper core 21 has the same shape as the lower core 22; and the upper silicon substrate 11 is provided with a core slot on a lower surface thereof corresponding to the shape of the upper core 21, and the lower silicon substrate 12 is provided with a core slot on an upper surface thereof corresponding to the shape of the lower core 22; the upper core 21 and the lower core 22 are disposed in the corresponding core slots, respectively, and the lower surface of the upper silicon substrate 11 and the upper surface of the lower silicon substrate 12 are bonded to each other, so that a lower surface of the upper core 21 and an upper surface of the lower core 22 are aligned with each other.

In an embodiment, the upper core 21 and the lower core 22 are two cores with the same shape, which are formed by dividing the toroidal soft magnetic core 2 in the vertical direction equally. Each of the upper core 21 and the lower core 22 has a toroidal shape and a thickness of being half of the thickness of the toroidal soft magnetic core 2. In the same way, the upper silicon substrate 11 and the lower silicon substrate 12 are formed by dividing the silicon substrate 1 in a vertical direction equally, and both are arranged symmetrically.

By dividing the silicon substrate and the toroidal soft magnetic core into two equal parts, respectively, the overall inductor is convenient to process. At the same time, by dividing the toroidal soft magnetic core into two parts: the upper core and the lower core, the eddy current loss in the iron core may be reduced, which further improves the efficiency of the inductor.

In the foregoing embodiments, as shown in FIGS. 2 and 3, the spiral channel includes a plurality of first horizontal trenches 31', a plurality of second horizontal trenches 32', and a plurality of vertical through holes 33', respectively; the first horizontal trenches 31' are disposed on the upper surface of the silicon substrate 1, the second horizontal trenched 32' are disposed on the lower surface of the silicon substrate 1, and the vertical through holes 33' penetrate the upper and lower surfaces of the silicon substrate; and the head and tail of any one of the first horizontal trenches 31' of the spiral channel communicate with two vertical through holes 33' respectively, and the two vertical through holes 33' communicate with two adjacent second horizontal trenches 32', respectively.

In an embodiment, when the silicon substrate 1 is divided into the upper silicon substrate 11 and the lower silicon substrate 12, each vertical through hole 33' is also divided into two parts located in the upper silicon substrate 11 and the lower silicon substrate 12, respectively.

Specifically, in the spiral channel, the plurality of first horizontal trenches 31' and the plurality of second horizontal trenches 32' communicate by the plurality of vertical through holes 33'. It may be understood that the vertical through holes 33' may be toroidal or arc-shaped, and the first horizontal trenches 31' and the second horizontal trenches 32' may also be toroidal or arc-shaped.

In the foregoing embodiments, as shown in FIG. 1, the inductor further includes two pins 4 and two pin slots 4'; the two pin slots 4' are disposed on the upper surface of the silicon substrate 1, the two pin slots 4' communicate with the head and the tail of the spiral channel, respectively, and the two pins 4 are disposed in the two pin slots 4', respectively.

Specifically, in one aspect, since the two pin slots 4' communicate with the head and tail of the spiral channel, the two pins 4 are connected to the head and the tail of the solenoid 3. When the inductor is working, the two pins 4 constitute an input end and an output end of the inductor, respectively.

In the foregoing embodiments, the toroidal soft magnetic core 2 is made of iron-nickel alloy material or iron-cobalt alloy material.

In the foregoing embodiments, the solenoid 3 is made of metallic copper.

Figure 4:
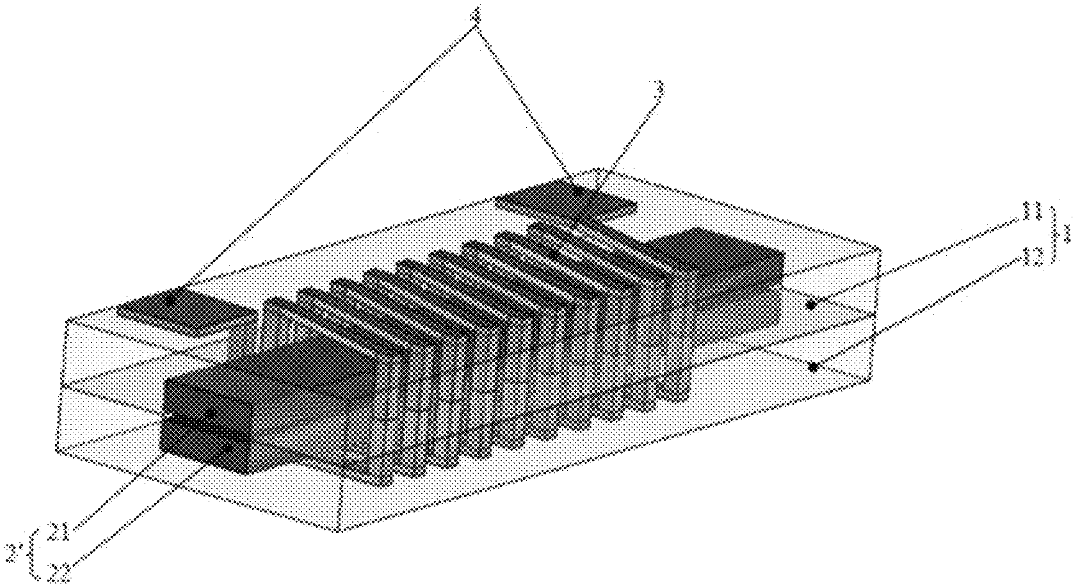
FIG. 4 is a schematic diagram showing a three-dimensional structure of a MEMS linear solenoid inductor according to an embodiment of the present application.
Figure 5:
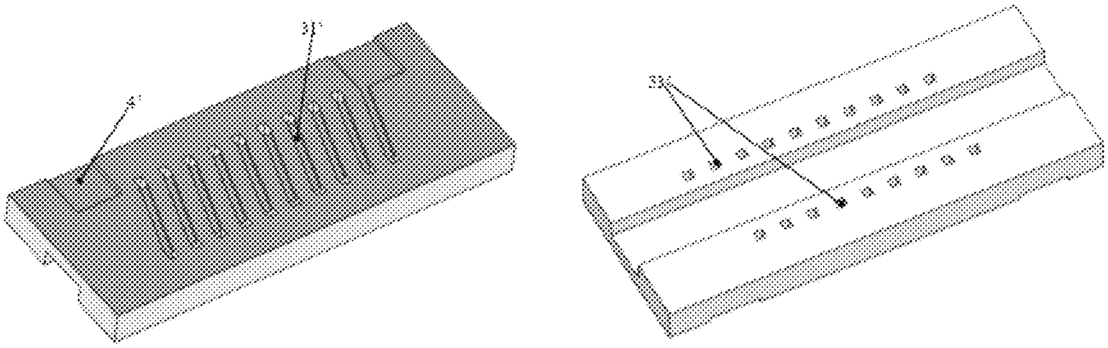
FIG. 5 is a second schematic diagram showing a three-dimensional structure of an upper silicon substrate according to an embodiment of the present application.
Figure 6:
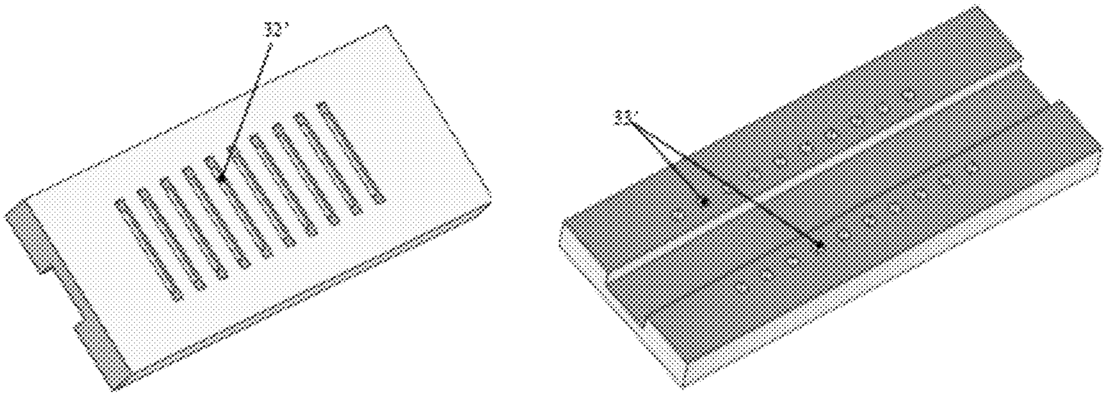
FIG. 6 is a second schematic diagram showing a three-dimensional structure of a lower silicon substrate according to an embodiment of the present application.

FIG. 4 is a schematic diagram showing a three-dimensional structure of a MEMS linear solenoid inductor according to an embodiment of the present application. As shown in FIG. 4, the MEMS linear solenoid inductor includes: a silicon substrate 1, a linear soft magnetic core 2', and a solenoid 3; wherein, the linear soft magnetic core 2' is wrapped inside the silicon substrate 1, as shown in FIGS. 5 and 6, the silicon substrate 1 is provided with a spiral channel, two opposite sides of the linear soft magnetic core 2' pass through a center of the spiral channel and the solenoid 3 is disposed in the spiral channel.

In an embodiment, since the spiral channel is disposed on the silicon substrate 1, the solenoid 3 disposed in the spiral channel is also disposed inside the silicon substrate 1, that is, the linear soft magnetic core 2' and the solenoid 3 of the inductor are both disposed inside the silicon substrate 1.

Specifically, the solenoid 3 has the same shape as the spiral channel, and the solenoid 3 is disposed in the spiral channel. Since the linear soft magnetic core 2' passes through the center of the spiral channel, the linear soft magnetic core 2' also passes through the center of the solenoid 3. When the inductor is working, the solenoid 3 is used as a winding of the inductor, head and tail ends of the solenoid 3 constitute an input end and an output end of the inductor, respectively. It may be understood that the inductance value of the inductor is determined by the number of turns of the solenoid 3.

For the MEMS linear solenoid inductor according to the embodiment of the present application, by disposing the linear soft magnetic core and the solenoid of the inductor inside the silicon substrate completely, the thickness of the silicon substrate is fully utilized, the inductor obtained has a larger winding cross-sectional area, which makes the inductance value of the inductor higher and the magnetic flux larger; at the same time, the silicon substrate plays a protective role on the linear soft magnetic core, and the solenoid, the strength of the inductor is improved, and the good impact resistance is provided.

In the foregoing embodiments, as shown in FIGS. 5 and 6, the silicon substrate 1 is divided into an upper silicon substrate 11 and a lower silicon substrate 12, the linear soft magnetic core 2' is divided into an upper core 21 and a lower core 22, and the upper core 21 has the same shape as the lower core 22; and the upper silicon substrate 11 is provided with a core slot on a lower surface thereof corresponding to the shape of the upper core 21, and the lower silicon substrate 12 is provided with a core slot on an upper surface thereof corresponding to the shape of the lower core 22; the upper core 21 and the lower core 22 are disposed in the corresponding core slots, respectively, and the lower surface of the upper silicon substrate 11 and the upper surface of the lower silicon substrate 12 are bonded to each other, so that a lower surface of the upper core 21 and an upper surface of the lower core 22 are aligned with each other.

In an embodiment, the upper core 21 and the lower core 22 are two cores with the same shape, which are formed by dividing the linear soft magnetic core 2' in the vertical direction equally. Each of the upper core 21 and the lower core 22 has a linear shape and a thickness of being half of the thickness of the linear soft magnetic core 2'. In the same way, the upper silicon substrate 11 and the lower silicon substrate 12 are formed by dividing the silicon substrate 1 in a vertical direction equally, and both are arranged symmetrically.

By dividing the silicon substrate and the linear soft magnetic core into two equal parts, respectively, the overall inductor is convenient to process. At the same time, by dividing the linear soft magnetic core into two parts: the upper core and the lower core, the eddy current loss in the iron core may be reduced, which further improves the efficiency of the inductor.

In the foregoing embodiment, as shown in FIGS. 5 and 6, the spiral channel includes a plurality of first horizontal trenches 31', a plurality of second horizontal trenches 32', and a plurality of vertical through holes 33', respectively; the first horizontal trenches 31' are disposed on the upper surface of the silicon substrate 1, the second horizontal trenched 32' are disposed on the lower surface of the silicon substrate 1, and the vertical through holes 33' penetrate the upper and lower surfaces of the silicon substrate; and the head and the tail of any one of the first horizontal trenches 31' of the spiral channel communicate with two vertical through holes 33' respectively, and the two vertical through holes 33' communicate with two adjacent second horizontal trenches 32', respectively.

In an embodiment, when the silicon substrate 1 is divided into the upper silicon substrate 11 and the lower silicon substrate 12, each vertical through hole 33' is also divided into two parts located in the upper silicon substrate 11 and the lower silicon substrate 12, respectively.

Specifically, in one aspect, in the spiral channel, the plurality of first horizontal trenches 31' disposed parallel to each other and the plurality of second horizontal trenches 32' also disposed parallel to each other communicate by the plurality of vertical through holes 33'. It may be understood that the vertical through holes 33' may be linear or arc-shaped, and the first horizontal trenches 31' and the second horizontal trenches 32' may also be linear or arc-shaped.

In the foregoing embodiments, as shown in FIG. 4, the inductor further includes two pins 4 and two pin slots 4; the two pin slots 4' are disposed on the upper surface of the silicon substrate 1, the two pin slots 4' communicate with the head and the tail of the spiral channel, respectively, and the two pins 4 are disposed in the two pin slots 4', respectively.

Specifically, in one aspect, since the two pin slots 4' communicate with the head and the tail of the spiral channel, the two pins 4 are connected to the head and the tail of the solenoid 3. When the inductor is working, the two pins 4 constitute an input end and an output end of the inductor, respectively.

In the foregoing embodiments, the linear soft magnetic core 2' is made of iron-nickel alloy material or iron-cobalt alloy material.

In the foregoing embodiments, the solenoid 3 is made of metallic copper.

An embodiment of the present application provides a method for manufacturing a MEMS solenoid inductor, for fabricating the toroidal solenoid inductor or the linear solenoid inductor above, including:

step 1, fabricating an upper silicon substrate and a lower silicon substrate, respectively;

wherein, if the soft magnetic core is the toroidal soft magnetic core, the fabricating an upper silicon substrate includes: performing a first thermal oxidation on a first silicon wafer with a first preset thickness; according to the structure of the spiral channel, performing deep silicon etching on an upper surface, inside and a lower surface of the first silicon wafer subjected to the first thermal oxidation to obtain a plurality of first horizontal trenches, upper halves of a plurality of vertical through holes, and a core slot; performing a second thermal oxidation on the first silicon wafer subjected to the deep silicon etching to obtain the upper silicon substrate; the fabricating a lower silicon substrate includes: performing the first thermal oxidation on a second silicon wafer with the first preset thickness; according to the structure of the spiral channel, performing the deep silicon etching on an upper surface, inside and a lower surface of the second silicon wafer subjected to the first thermal oxidation to obtain a core slot, lower halves of the plurality of vertical through holes, and a plurality of second horizontal trenches; performing the second thermal oxidation on the second silicon wafer subjected to the deep silicon etching to obtain the lower silicon substrate;

wherein, if the soft magnetic core is the linear soft magnetic core, the fabricating an upper silicon substrate includes: performing a first thermal oxidation on a first silicon wafer with a first preset thickness; according to the structure of the spiral channel, performing deep silicon etching on an upper surface, inside and a lower surface of the first silicon wafer subjected to the first thermal oxidation to obtain a plurality of parallel first horizontal trenches, upper halves of a plurality of vertical through holes, and a core slot; performing a second thermal oxidation on the first silicon wafer subjected to the deep silicon etching to obtain the upper silicon substrate; the fabricating a lower silicon substrate includes: performing the first thermal oxidation on a second silicon wafer with the first preset thickness; according to the structure of the spiral channel, performing the deep silicon etching on an upper surface, inside and a lower surface of the second silicon wafer subjected to the first thermal oxidation to obtain a core slot, lower halves of the plurality of vertical through holes, and a plurality of parallel second horizontal trenches; performing the second thermal oxidation on the second silicon wafer subjected to the deep silicon etching to obtain the lower silicon substrate;

step 2, electroplating inside the core slots of the upper silicon substrate and the lower silicon substrate to form an upper core and a lower core, respectively;

step 3, after aligning the upper surface of the upper silicon substrate and the lower surface of the lower silicon substrate with each other and aligning the lower surface of the upper core and the upper surface of the lower core with each other, bonding the upper silicon substrate and the lower silicon substrate at low temperature to form the spiral channel in the upper silicon substrate and the lower silicon substrate which are bonded; and step 4, electroplating in the spiral channel to form a solenoid, thereby obtaining the MEMS solenoid inductor.

Wherein, in step 1, the difference in structure between the upper silicon substrate 11 and the lower silicon substrate 12 is essentially only that the upper surface of the upper silicon substrate 11 is provided with the first horizontal trenches 31' while the lower surface of the lower silicon substrate 12 is provided with the second horizontal trenches 32', the remaining structures thereof are the same, and the upper silicon substrate 11 and the lower silicon substrate 12 are arranged symmetrically and processed in a basically identical manner before being bonded.

In step 2, the upper core 21 and the lower core 22 are formed by electroplating on the upper silicon substrate 11 and the lower silicon substrate 12, respectively. Because the core needs to be completely wrapped inside the silicon substrate, the step of core electroplating is completed before the upper silicon substrate 11 and the lower silicon substrate 12 are bonded.

In step 3, when the upper silicon substrate 11 and the lower silicon substrate 12 are bonded, it is necessary to ensure that the lower surface of the upper core 21 and the upper surface of the lower core 22 are aligned with each other to ensure the magnetic fields of the upper core 21 and the lower core 22 coordinate with each other. At the same time, after the upper silicon substrate 11 and the lower silicon substrate 12 are bonded, the horizontal trenches previously disposed on the upper silicon substrate 11 and the lower silicon substrate 12 respectively and the vertical through holes are combined to form the spiral channel.

In step 4, after the spiral channel is formed, the solenoid 3 may be formed only by electroplating relevant metal therein.

Specifically, in one aspect, the first silicon wafer and the second silicon wafer may be double-polished silicon wafers having a thickness of 1000 μm, and also high-resistivity silicon wafers so as to improve the overall insulation of the inductor and reduce the eddy current loss under a high frequency. It is generally sufficient to form a thermal oxide layer having a thickness of 2 μm when the first silicon wafer and the second silicon wafer are subjected to thermal oxidation. According to the structure of the toroidal soft magnetic core 2 or the linear soft magnetic core 2' and the spiral channel, deep silicon etching is performed on the first silicon wafer and the second silicon wafer to obtain the upper silicon substrate 11 and the lower silicon substrate 12 and thermal oxidation treatment is performed, then the upper silicon substrate 11 and the lower silicon substrate 12 may be used as bases for fabricating other structures of the inductor. Next, the upper core 21 and the lower core 22 are formed at the corresponding positions of the upper silicon substrate 11 and the lower silicon substrate 12 by electroplating. The upper core 21 and the lower core 22 are wrapped inside the silicon substrate 1 by bonding, and a complete spiral channel is formed. Electroplating is performed in the spiral channel to form the solenoid 3, thereby completing the fabrication of the MEMS solenoid inductor.

In the method for manufacturing a MEMS solenoid inductor according to the embodiments of the present application, the silicon substrate is divided into two symmetrical parts to be fabricated separately, and then the core electroplating is completed before bonding the upper and lower silicon substrates, and electroplating is performed after bonding the upper and lower silicon substrates to form the solenoid. Accordingly, it is substantially ensured that the inductor may be inserted into the core with high efficiency and high quality. While, according to other methods, it is difficult to form a core slot in the middle of the coil and insert the core, and thus it is difficult to achieve the above purpose. Therefore, no multilayer deep silicon etching needs to be adopted during the entire manufacturing process, which improves the fault tolerance rate of processing and has good repeatability. The obtained inductor has high structural accuracy, is compatible with IC semiconductor processes, and is suitable for large-scale production. Through the technical solution described herein, the thickness of the silicon substrate is fully utilized, the obtained inductor has a larger winding cross-sectional area and higher magnetic flux, which makes the inductance value of the inductor larger; at the same time, the silicon substrate plays a protective role on the soft magnetic core and the solenoid, the strength of the inductor is improved, and the good impact resistance is provided.

In the foregoing embodiments, the electroplating inside the core slot of the upper silicon substrate 11 to form an upper core 21 specifically includes: after registering a metal mask with a core slot pattern with the core slot on the lower surface of the upper silicon substrate 11, tightly attaching the metal mask to the lower surface of the upper silicon substrate 11; and after magnetron sputtering metallic nickel or metallic cobalt with a second preset thickness as a seed layer on the lower surface of the upper silicon substrate 11, electroplating iron-nickel alloy or iron-cobalt alloy with a third preset thickness inside the core slot of the upper silicon substrate 11 to obtain the upper core 21.

Correspondingly, the electroplating inside the core slot of the lower silicon substrate 12 to form a lower core 22 specifically includes: after registering a metal mask with a core slot pattern with the core slot on the upper surface of the lower silicon substrate 12, tightly attaching the metal mask to the upper surface of the lower silicon substrate 12; and after magnetron sputtering metallic nickel or metallic cobalt with the second preset thickness as a seed layer on the upper surface of the lower silicon substrate 12, electroplating iron-nickel alloy or iron-cobalt alloy with the third preset thickness inside the core slot of the lower silicon substrate 12 to obtain the lower core 22.

In an embodiment, when the core is made of iron-nickel alloy, the corresponding seed layer is made of metallic nickel; while when the core is made of iron-cobalt alloy, the corresponding seed layer is made of metallic cobalt. The thickness of the seed layer, i.e., the second preset thickness may be determined according to actual process requirements. The thickness of the upper core 21 and the lower core 22, i.e., the third preset thickness is determined according to the depths of the core slots.

Specifically, in one aspect, the processes adopted in the manufacturing procedures of the upper core 21 and the lower core 22 are completely the same, except that the positions where the upper core 21 and the lower core 22 are formed are different, and both may be processed separately at the same time.

In the foregoing embodiments, the electroplating in the spiral channel to form a solenoid specifically includes: magnetron sputtering metallic titanium with a fourth preset thickness as an intermediate layer on the lower surface of the lower silicon substrate, magnetron sputtering metallic copper with a fifth preset thickness as a seed layer on the intermediate layer, and then electroplating metallic copper in the second horizontal trenches and the vertical through holes of the spiral channel until the metallic copper is filled to the position of a lower plane of the first horizontal trenches; and after magnetron sputtering metallic copper as a seed layer on the upper surface of the upper silicon substrate, electroplating metallic copper until the spiral channel is completely filled with metallic copper to obtain the solenoid.

In the foregoing embodiments, the fabricating an upper silicon substrate further includes: according to the structure and position of two pins, performing deep silicon etching on the upper surface of the first silicon wafer subjected to the first oxidation to obtain two pin slots; correspondingly, step 4 further includes electroplating in the two pin slots to form the two pins.

The manufacturing method of the MEMS solenoid inductor is further described by an example. It should be noted that the following is only an example of the embodiment of the present application, and the embodiment of the present application is not limited thereto.

Figure 7:
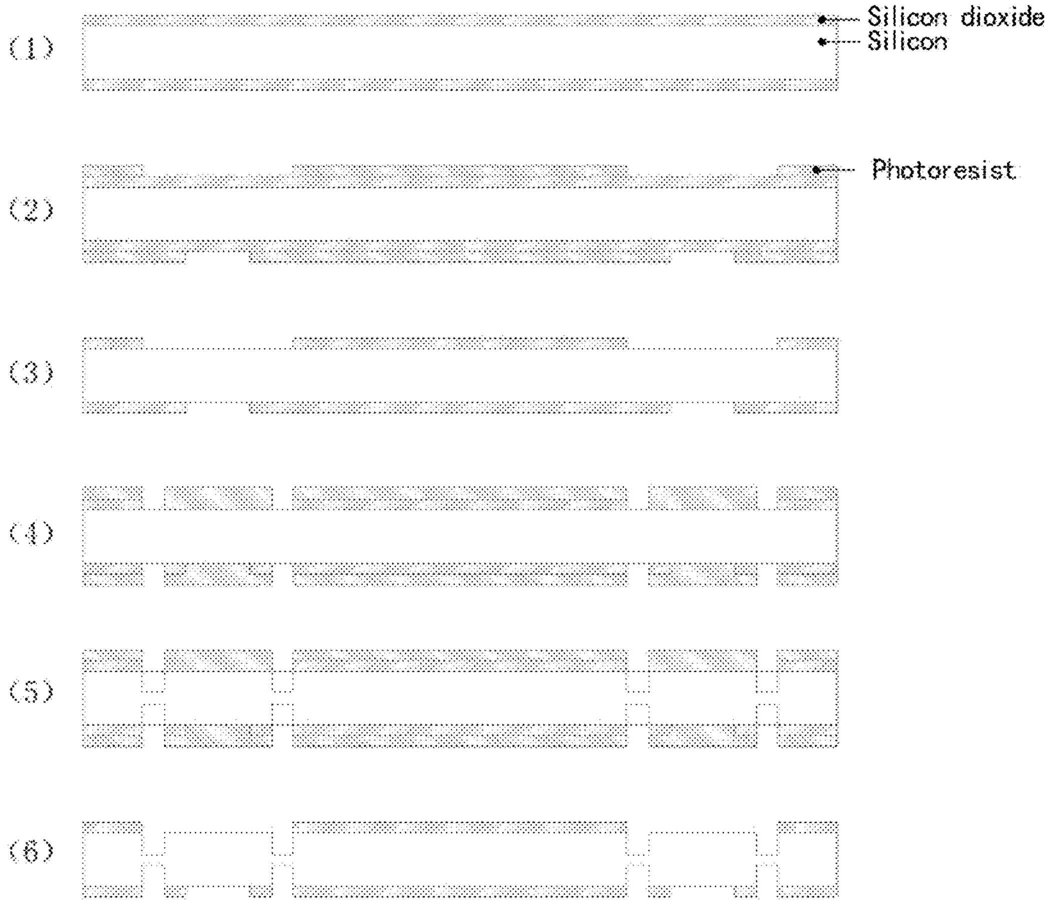
FIG. 7 is a schematic cross-sectional view of steps (1) to (6) of a manufacturing process of a MEMS toroidal solenoid inductor in an example according to an embodiment of the present application.
Figure 8:
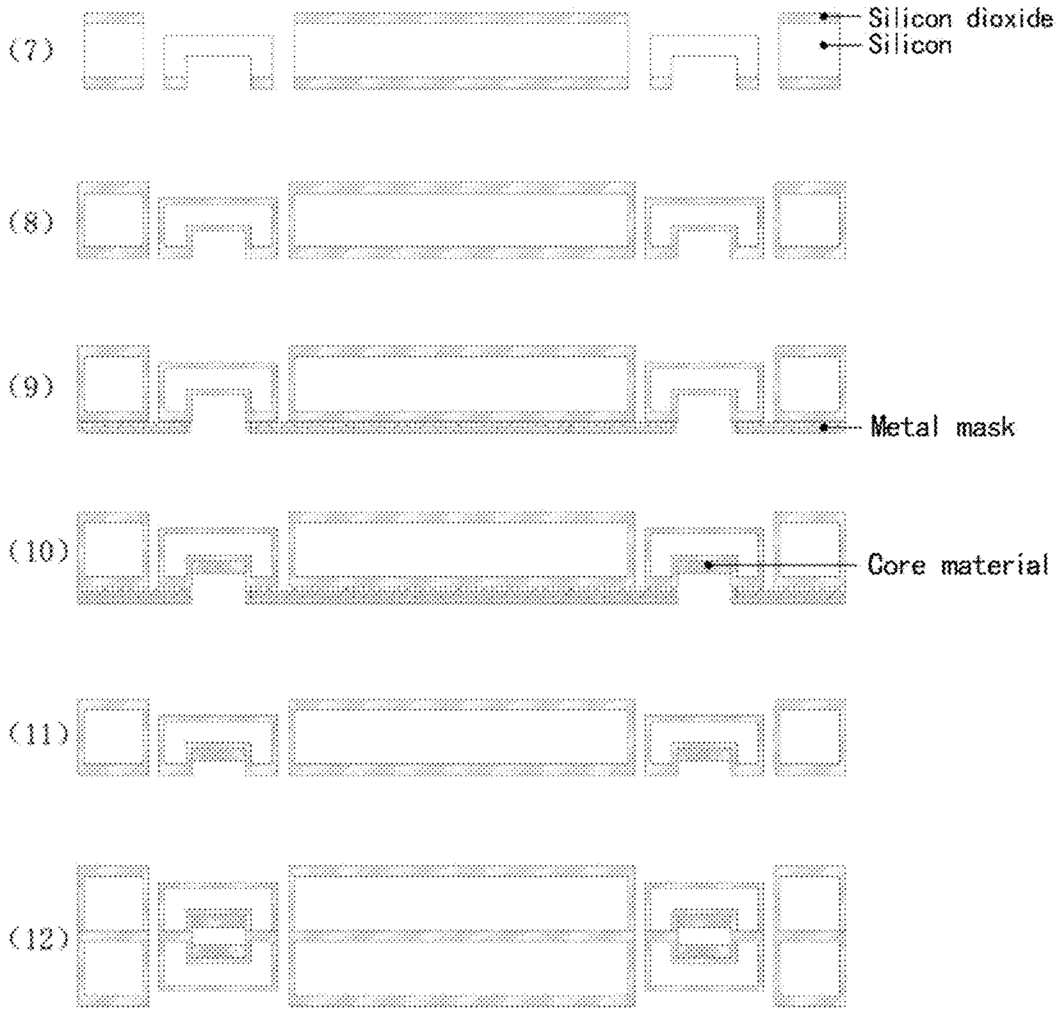
FIG. 8 is a schematic cross-sectional view of steps (7) to (12) of a manufacturing process of a MEMS toroidal solenoid inductor in an example according to an embodiment of the present application.
Figure 9:
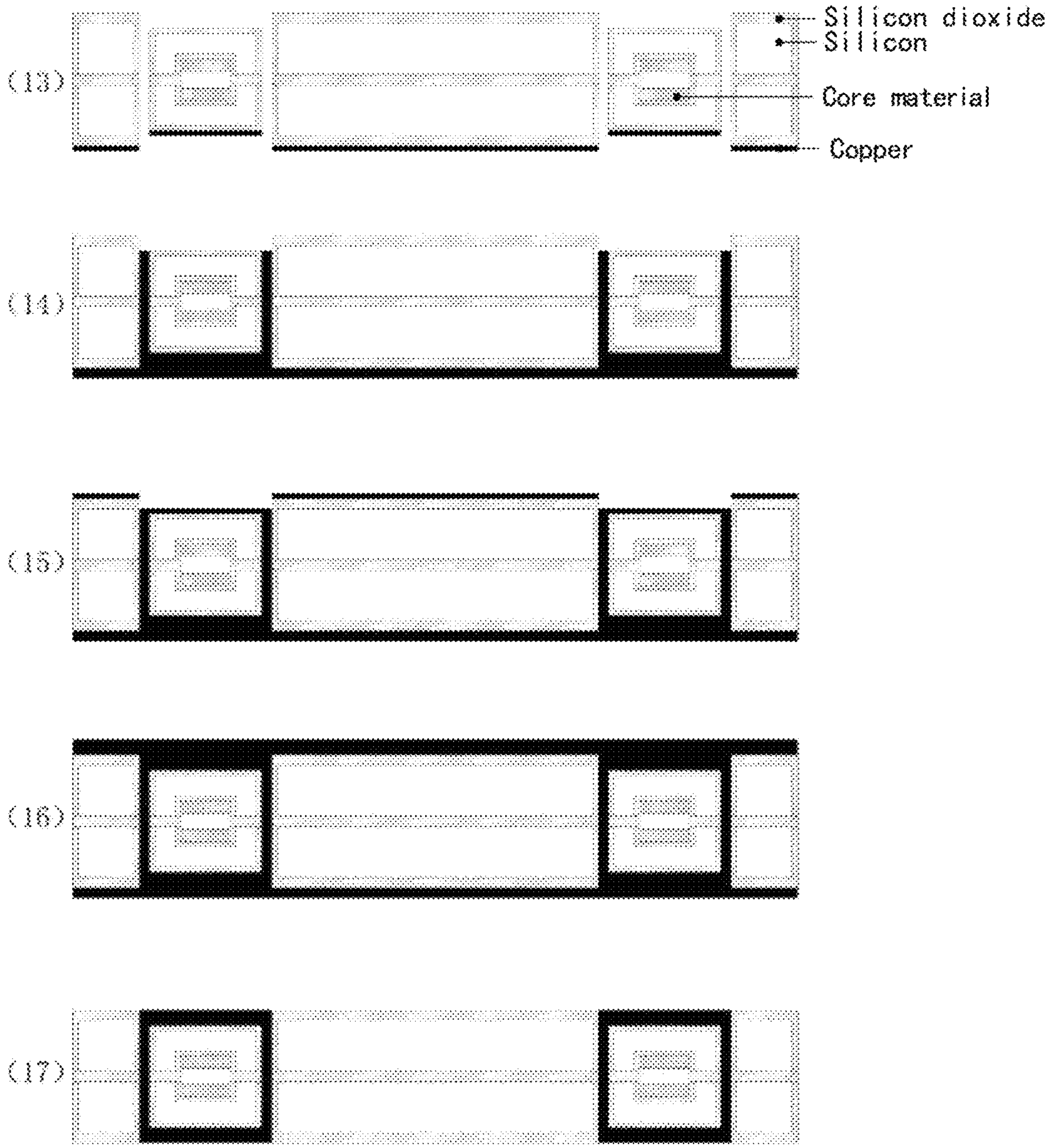
FIG. 9 is a schematic cross-sectional view of steps (13) to (17) of a manufacturing process of a MEMS toroidal solenoid inductor in an example according to an embodiment of the present application.
Figure 10:
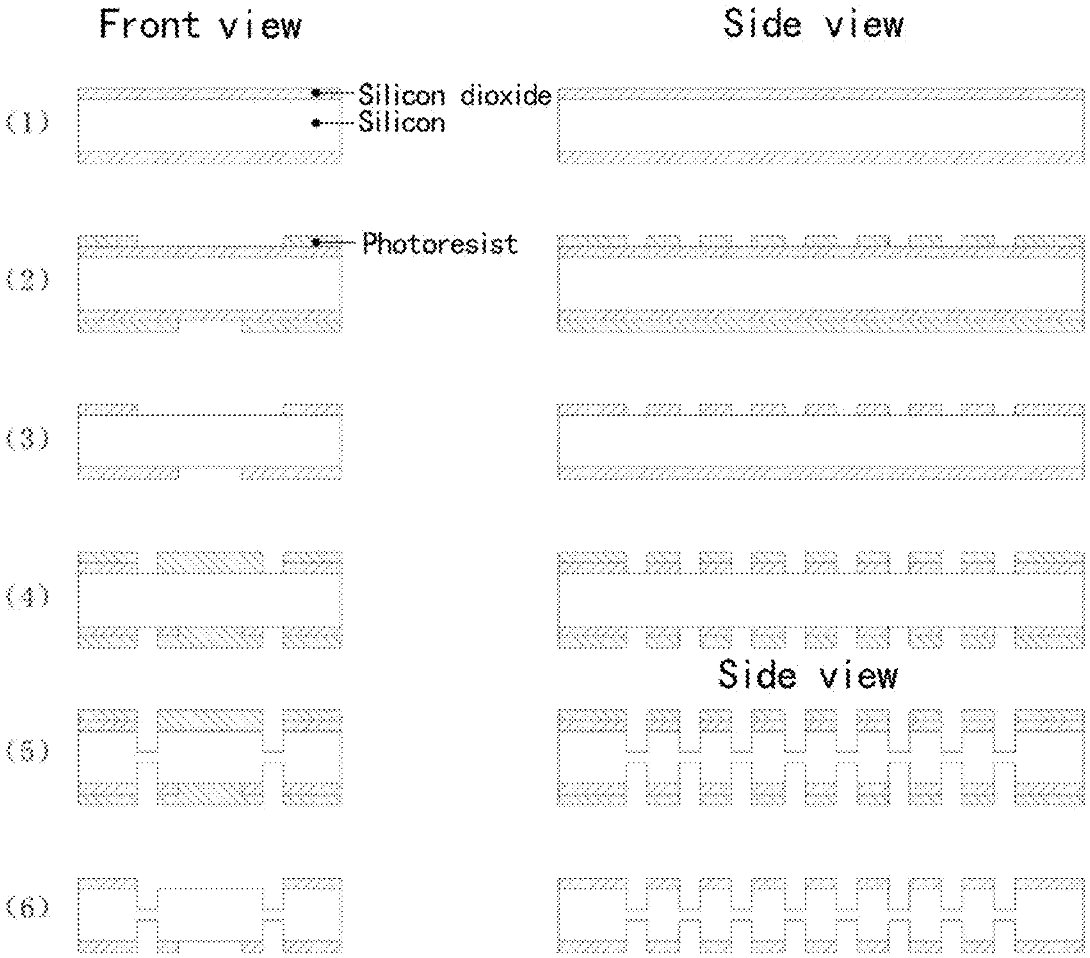
FIG. 10 is a schematic cross-sectional view of steps (1) to (6) of a manufacturing process of a MEMS linear solenoid inductor in an example according to an embodiment of the present application.
Figure 11:
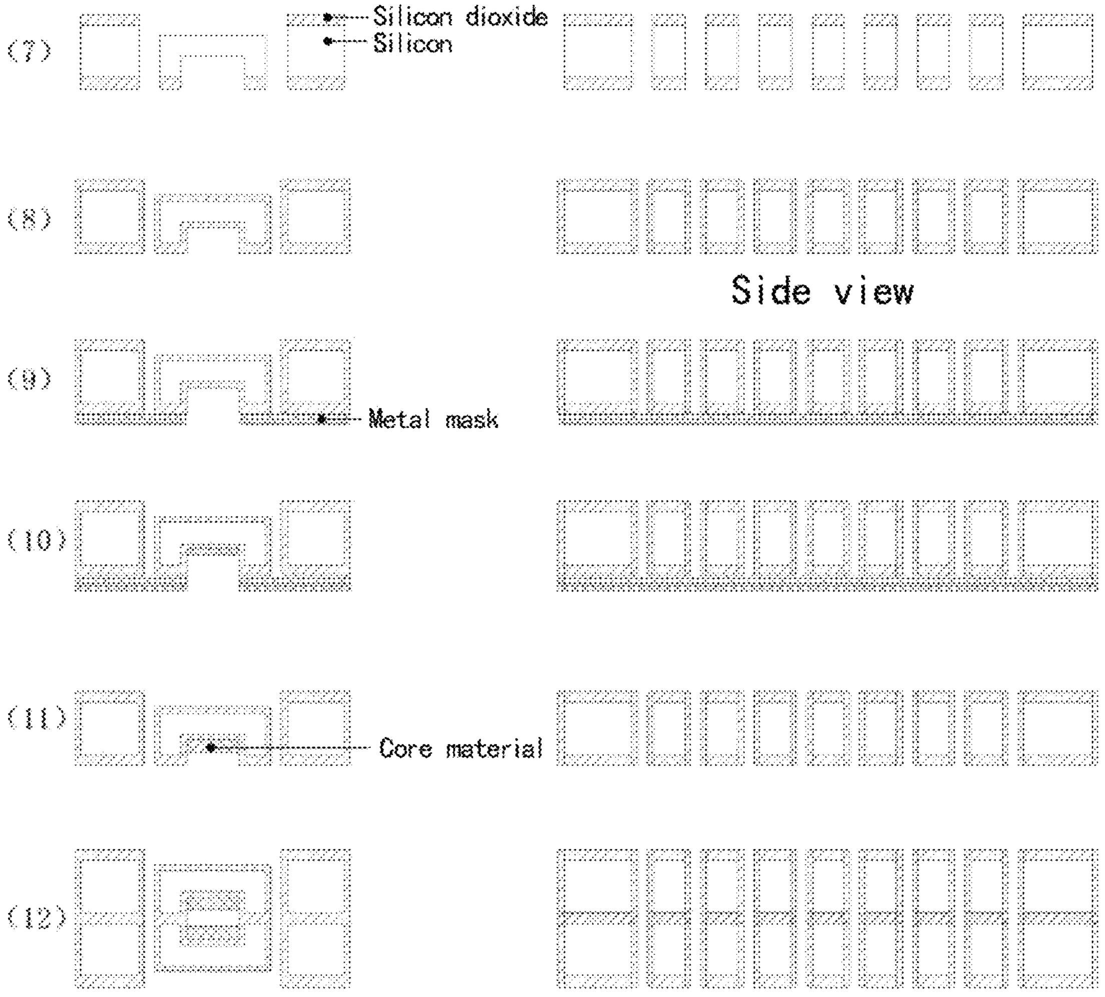
FIG. 11 is a schematic cross-sectional view of steps (7) to (12) of a manufacturing process of a MEMS linear solenoid inductor in an example according to an embodiment of the present application.
Figure 12:
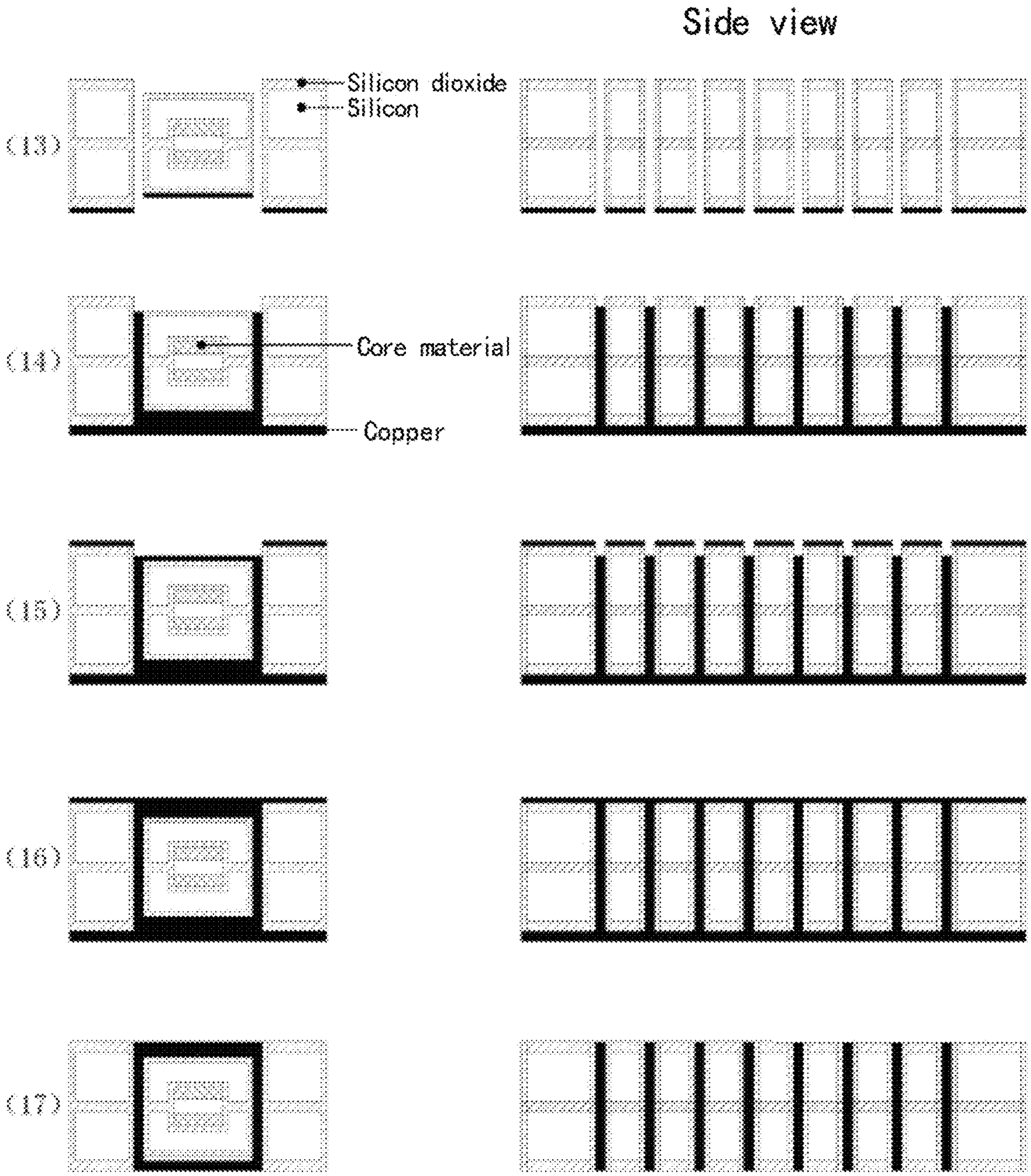
FIG. 12 is a schematic cross-sectional view of steps (13) to (17) of a manufacturing process of a MEMS linear solenoid inductor in an example according to an embodiment of the present application.

FIGS. 7 to 9 are schematic cross-sectional views of steps (1) to (17) of a manufacturing process of a MEMS toroidal solenoid inductor in an example according to an embodiment of the present application; and FIGS. 10 to 12 are schematic cross-sectional views of steps (1) to (17) of a manufacturing process of a MEMS linear solenoid inductor in an example according to an embodiment of the present application, specifically:

(1) adopting a double-polished silicon wafer having a thickness of 1000 μm, wherein a high-resistivity silicon wafer is adopted to improve the overall structural insulation and reduce the eddy current loss under a high frequency, and the silicon wafer is subjected to thermal oxidization to produce a double-sided thermal oxide layer having a thickness of 2 μm;

(2) coating a photoresist, exposing the first horizontal trenches (covering positions of the vertical through holes) and contact patterns on the upper surface of the upper silicon substrate, exposing the vertical through holes and the second horizontal trenches on the upper surface of the lower silicon substrate, exposing core slot patterns on the lower surfaces of the upper silicon substrate and the lower silicon substrate, respectively, and constituting the spiral channel from the first horizontal trenches, the second horizontal trenches and the vertical through holes;

(3) removing silicon dioxide at the exposed positions by a BOE (buffered oxide etch) solution to pattern the silicon dioxide;

(4) coating a photoresist for a second time and exposing vertical through hole patterns on the upper and lower surfaces of the upper silicon substrate and the lower silicon substrate;

(5) performing deep silicon etching on the upper and lower surfaces to etch the silicon through hole patterns to a certain depth;

(6) removing the photoresist using piranha solution;

(7) etching the upper surface with the oxide layer as a masking layer to obtain horizontal trenches on the upper surface and vertical through holes, and etching the lower surface with the oxide layer as a masking layer to obtain core pattern;

(8) performing thermal oxidation to form an oxide layer having a thickness of 2 μm;

(9) taking the metal mask with the core slot patterns, aligning the core slot patterns thereon with the core slot patterns on the lower surfaces of the first silicon wafer and the second silicon wafer, and tightly attaching the metal mask to the lower surface of the silicon wafers;

(10) magnetron sputtering 100 nm of metallic nickel as a seed layer on the lower surface;

(11) electroplating iron-nickel alloy and filling the iron-nickel alloy from the bottom to 100 μm from the surface of the silicon wafer;

(12) opposing the lower surfaces of the upper silicon substrate and the lower silicon substrate to each other, and performing low-temperature silicon-silicon bonding;

(13) magnetron sputtering 100 nm of metallic nickel as an intermediate layer on the lower surface of the bonded double-layer silicon wafer, and then sputtering 500 nm of metallic copper as a seed layer;

(14) electroplating metallic copper, filling the electroplated copper from the bottom to the position of the lower plane of the horizontal wire at the top;

(15) magnetron sputtering 500 nm of metallic copper on the upper surface;

(16) electroplating metallic copper, so that the entire structure on the upper surface is completely covered by the electroplated copper; and

(17) thinning metallic copper on the upper and lower surfaces by a CMP (chemical mechanical polisher) until the metallic copper is thinned to the same height as to the surface of the thermal oxide layer of the silicon wafer, and then polishing the surfaces by CMP to complete the fabrication of the MEMS three-dimensional solenoid inductor.

Finally, it should be noted that the above embodiments are only used to explain the technical solutions of the present application, and are not limited thereto; although the present application is described in detail with reference to the foregoing embodiments, it should be understood by those skilled in the art that they can still modify the technical solutions described in the foregoing embodiments and make equivalent replacements to a part of the technical features; and these modifications and substitutions do not cause the essence of the corresponding technical solutions depart from the spirit and scope of the technical solutions of various embodiments of the present application.

The invention claimed is:

1. A MEMS linear solenoid inductor, comprising:

a silicon substrate, a soft magnetic core, and a solenoid;

wherein the soft magnetic core is wrapped inside the silicon substrate, the silicon substrate is provided with a spiral channel, the soft magnetic core passes through a center of the spiral channel, and the solenoid is disposed in the spiral channel;

wherein the silicon substrate comprises an upper silicon substrate and a lower silicon substrate, the soft magnetic core comprises an upper core and a lower core, and the upper core has the same shape as the lower core;

wherein the upper silicon substrate is provided with a core slot on a lower surface thereof corresponding to a shape of the upper core, and the lower silicon substrate is provided with a core slot on an upper surface thereof corresponding to the shape of the lower core; and wherein the upper core and the lower core are disposed in the corresponding core slots, respectively, and the lower surface of the upper silicon substrate and the upper surface of the lower silicon substrate are bonded to each other, so that a lower surface of the upper core and an upper surface of the lower core are aligned with each other.

2. The MEMS linear solenoid inductor of claim 1, wherein the spiral channel comprises a plurality of first horizontal trenches, a plurality of second horizontal trenches and a plurality of vertical through holes;

wherein the first horizontal trenches are disposed on an upper surface of the silicon substrate, the second horizontal trenches are disposed on a lower surface of the silicon substrate, and the vertical through holes penetrate the upper and lower surfaces of the silicon substrate; and wherein a head and a tail of any one of the first horizontal trenches of the spiral channel communicate with two vertical through holes respectively, and the two vertical through holes communicate with two adjacent second horizontal trenches, respectively.

3. The MEMS linear solenoid inductor of claim 1, further comprising two pins and two pin slots;

wherein the two pin slots are disposed on an upper surface of the silicon substrate, the two pin slots communicate with a head and a tail of the spiral channel, respectively, and the two pins are disposed in the two pin slots, respectively.

4. The MEMS linear solenoid inductor of claim 1, wherein the soft magnetic core is made of an iron-nickel alloy material or an iron-cobalt alloy material.

5. The MEMS linear solenoid inductor of claim 1, wherein the solenoid is made of metallic copper.

6. A method for manufacturing the MEMS linear solenoid inductor of claim 1, the method comprising the steps of:

step 1, fabricating the silicon substrate having an upper silicon substrate and a lower silicon substrate, respectively;

wherein the fabricating an upper silicon substrate includes:

performing a first thermal oxidation on a first silicon wafer with a first preset thickness;

according to a structure of the spiral channel of the silicon substrate, performing deep silicon etching on an upper surface, inside, and a lower surface of the first silicon wafer subjected to the first thermal oxidation to obtain a plurality of first horizontal trenches, upper halves of a plurality of vertical through holes, and a core slot;

performing a second thermal oxidation on the first silicon wafer subjected to the deep silicon etching to obtain the upper silicon substrate;

wherein the fabricating a lower silicon substrate includes:

performing the first thermal oxidation on a second silicon wafer with the first preset thickness;

according to the structure of the spiral channel of the silicon substrate, performing the deep silicon etching on an upper surface, inside, and a lower surface of the second silicon wafer subjected to the first thermal oxidation to obtain a core slot, lower halves of the plurality of vertical through holes, and a plurality of second horizontal trenches;

performing the second thermal oxidation on the second silicon wafer subjected to the deep silicon etching to obtain the lower silicon substrate;

step 2, electroplating inside the core slots of the upper silicon substrate and the lower silicon substrate to form the soft magnetic core having an upper core and a lower core, respectively;

step 3, after aligning an upper surface of the upper silicon substrate and a lower surface of the lower silicon substrate with each other and aligning a lower surface of the upper core and an upper surface of the lower core with each other, bonding the upper silicon substrate and the lower silicon substrate at low temperature to form the spiral channel in the upper silicon substrate and the lower silicon substrate which are bonded; and step 4, electroplating in the spiral channel to form the solenoid, thereby obtaining the MEMS linear solenoid inductor;

wherein the soft magnetic core is wrapped inside the silicon substrate, the soft magnetic core passes through the center of the spiral channel, and the solenoid is disposed in the spiral channel;

wherein the plurality of first horizontal trenches are a plurality of parallel first horizontal trenches, and the plurality of second horizontal trenches are a plurality of parallel second horizontal trenches.

7. The method of claim 6, wherein the electroplating inside the core slot of the upper silicon substrate to form an upper core comprises:

after registering a metal mask with a core slot pattern with the core slot on a lower surface of the upper silicon substrate, tightly attaching the metal mask to the lower surface of the upper silicon substrate; and after magnetron sputtering metallic nickel or metallic cobalt with a second preset thickness as a seed layer on the lower surface of the upper silicon substrate, electroplating iron-nickel alloy or iron-cobalt alloy with a third preset thickness inside the core slot of the upper silicon substrate to obtain the upper core; correspondingly, the electroplating inside the core slot of the lower silicon substrate to form a lower core comprises:

after registering a metal mask with a core slot pattern with the core slot on an upper surface of the lower silicon substrate, tightly attaching the metal mask to the upper surface of the lower silicon substrate; and after magnetron sputtering metallic nickel or metallic cobalt with the second preset thickness as a seed layer on the upper surface of the lower silicon substrate, electroplating iron-nickel alloy or iron-cobalt alloy with the third preset thickness inside the core slot of the lower silicon substrate to obtain the lower core.

8. The method of claim 6, wherein the electroplating in the spiral channel to form the solenoid comprises:

magnetron sputtering metallic titanium with a fourth preset thickness as an intermediate layer on the lower surface of the lower silicon substrate, magnetron sputtering metallic copper with a fifth preset thickness as a seed layer on the intermediate layer, and then electroplating metallic copper in the second horizontal trenches and the vertical through holes of the spiral channel until the metallic copper is filled to a position of a lower plane of the first horizontal trenches; and after magnetron sputtering metallic copper as a seed layer on the upper surface of the upper silicon substrate, electroplating metallic copper until the spiral channel is completely filled with the metallic copper to obtain the solenoid.

9. The method of claim 6, wherein the fabricating an upper silicon substrate further comprises:

according to the structure and position of two pins, performing deep silicon etching on the upper surface of the first silicon wafer subjected to a first oxidation to obtain two pin slots; and correspondingly, step 4 further comprises electroplating in the two pin slots to form the two pins.

* * * * *